H. Retzlaff.
Land Roller.
No. 97,697. Patented Dec. 7, 1869.

Witnesses.
William W. Herthel
Robert Burns.

Inventor.
H. Retzlaff

United States Patent Office.

HERMANN RETZLAFF, OF ST. LOUIS, MISSOURI.

Letters Patent No. 97,697, dated December 7, 1869.

IMPROVEMENT IN LAND-ROLLER.

The Schedule referred to in these Letters Patent and making part of the same.

*To all whom it may concern:*

Be it known that I, HERMANN RETZLAFF, of St. Louis, in the county of St. Louis, and State of Missouri, have made certain new and useful Improvements in Land-Rollers; and I do hereby declare the following to be a full and true description thereof, reference being had to the accompanying drawings, and to the letters of reference marked thereon.

It is well known that land which has been properly compressed by rollers, will retain its moisture longer than loose or fallow soil; it is therefore especially valuable to roll and compress soils of a loose, porous nature, for crops requiring moisture in dry climates, or in seasons of drought.

Again, a firm soil is a better foundation and support for grain-stalks, and resists the formation of weeds and cheat-grain growths.

In order to more fully secure the advantages of rolling and compressing soil, the nature of this invention is in the use of a roller or rollers, formed with corrugated faces, thus causing ridges and depressions, the latter retaining rain, snow, and other moisture-deposits, and the whole roller acting more perfectly to cause compression and pulverization of clods by its ridged shape than if it were cylindrical.

In its mechanical construction, the nature of this invention relates to the use of a series of beads, usually of cast-iron, ranged side by side upon a square shaft, and secured against end play by a proper collar, forming one compact roller, with a corrugated surface, to act as above described.

Figure 1:
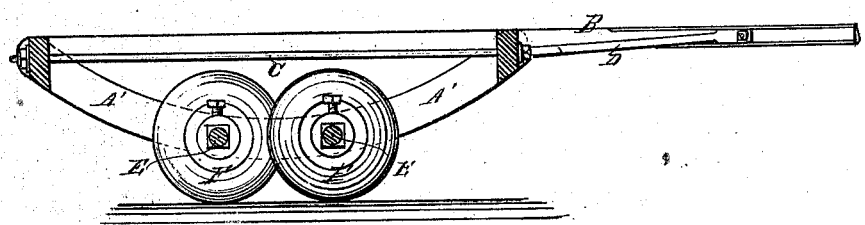
Figure 2:
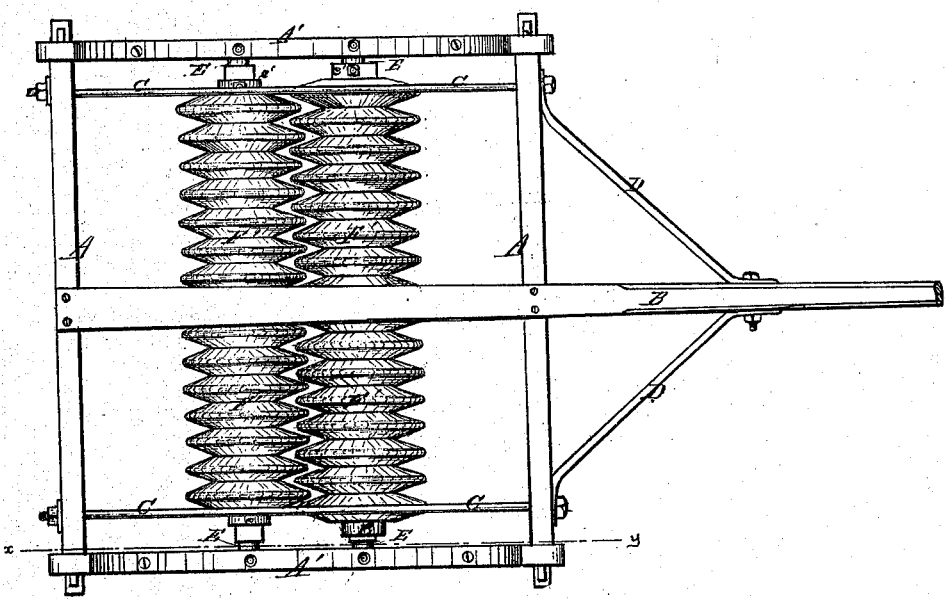

To enable those herein skilled to make and use my said invention, I will now more fully describe the same, referring to the accompanying Figure 1 as a sectional elevation, and to
Figure 2 as a top plan.

I secure the parts of my said roller in a proper frame, A, to which the tongue or pole B is suitably attached.

Said frame is braced by rods C, and the connection with the tongue B is made more secure by braces D.

On the side bars A' of said frame, I arrange, in proper bearings, the roller-shafts E, so as to turn freely in said bearings.

The inner part of said shafts is made square, and receives the beads F, which form, taken conjointly, the rollers F'.

The said beads will usually be made hollow, and of cast-iron, and have the outline of two frusta of cones, placed with their larger bases in contact, as shown in fig. 2.

It is plain, therefore, that breakage of any one or more of said beads does not render the entire roller useless, and that the broken parts may readily be replaced.

To prevent the beads F from end play, the shafts E have permanent collars, e, and adjustable collars e'.

By placing two rollers, F', in contiguity, and so that the beads of the one shall project into the indentation formed by the beads of the other, the said rollers will act to cleanse each other of clods, besides acting more efficiently in the distribution of the roller-pressure upon the soil.

Having thus fully described my invention,

What I claim, is—

The frame A, shafts E, and rollers F', with intermatching beads F, substantially as set forth.

In testimony of said invention, I have hereunto set my hand, in presence of—

HERMANN RETZLAFF.

Witnesses:
J. H. W. VOGEL,
WILLIAM W. HERTHEL.